(12) United States Patent
Yuzawa

(10) Patent No.: US 7,624,585 B2
(45) Date of Patent: Dec. 1, 2009

(54) FREEZER UNIT

(75) Inventor: Jiro Yuzawa, Gunma-ken (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 407 days.

(21) Appl. No.: 11/299,942

(22) Filed: Dec. 13, 2005

(65) Prior Publication Data

US 2006/0123805 A1    Jun. 15, 2006

(30) Foreign Application Priority Data

Dec. 14, 2004    (JP)    ............................. 2004-361093

(51) Int. Cl.
*C09K 5/04* (2006.01)

(52) U.S. Cl. ............................ 62/114; 62/79

(58) Field of Classification Search .................. 62/407, 62/498, 114, 79, 502, 467; 252/67, 68, 70, 252/69
See application file for complete search history.

(56) References Cited

U.S. PATENT DOCUMENTS

| | | | | |
|---|---|---|---|---|
| 3,768,273 A * | 10/1973 | Missimer | ........................ | 62/84 |
| 4,416,119 A * | 11/1983 | Wilson et al. | ................. | 62/149 |
| 4,439,996 A | 4/1984 | Frohbieter | .................... | 62/174 |
| 4,788,829 A * | 12/1988 | Takemasa et al. | ............. | 62/335 |
| 4,978,467 A * | 12/1990 | Shankland et al. | ............. | 252/69 |
| 5,092,138 A * | 3/1992 | Radermacher et al. | ........ | 62/502 |
| 5,254,279 A * | 10/1993 | Takemasa et al. | ............. | 252/67 |
| 5,265,443 A * | 11/1993 | Yuzawa et al. | ................. | 62/498 |
| 5,702,632 A * | 12/1997 | Weng | ........................... | 252/67 |
| 5,866,029 A * | 2/1999 | Lund et al. | ..................... | 252/67 |
| 6,235,215 B1 * | 5/2001 | Seino et al. | .................... | 252/68 |
| 6,502,410 B2 * | 1/2003 | Podtchereniaev et al. | ..... | 62/114 |
| 6,532,752 B1 * | 3/2003 | Arman et al. | ................. | 62/114 |
| 6,557,358 B2 | 5/2003 | Weng et al. | .................... | 62/114 |
| 6,652,769 B1 * | 11/2003 | Yuzawa | ........................ | 252/67 |
| 6,951,115 B2 * | 10/2005 | Yuzawa | ......................... | 62/114 |
| 2004/0123622 A1 * | 7/2004 | Yuzawa et al. | ................ | 62/475 |
| 2004/0124394 A1 | 7/2004 | Weng | .......................... | 252/67 |

FOREIGN PATENT DOCUMENTS

JP    58-23101    12/1978

(Continued)

OTHER PUBLICATIONS

Japanese Office Action dated May 12, 2009 in Japanese.

*Primary Examiner*—Melvin Jones
(74) *Attorney, Agent, or Firm*—Kratz, Quintos & Hanson, LLP

(57) ABSTRACT

The invention provides a freezer unit using refrigerants serving as an oil carrier without using any refrigerants of subjects of the ozone regulation and being capable of realizing extremely low temperatures such as −150° C. The freezer unit includes a refrigerant circuit on a high temperature side and a refrigerant circuit on a low temperature side to form independent closed refrigerant circuits which condense refrigerants delivered from compressors and thereafter evaporate the condensed refrigerants to achieve cooling action, and a cascade condenser formed by an evaporator in the refrigerant circuit on the high temperature side and a condenser in the refrigerant circuit on the low temperature side. Confined in the refrigerant circuit on the low temperature side are nonazeotropic mixed refrigerants containing R245fa, R600, R404A, R508A, R14, R50 and R740, or nonazeotropic mixed refrigerants containing R245fa, R600, R404A, R23, R14, R50 and R740, or nonazeotropic mixed refrigerants containing R245fa, R600, R404A, R508B, R14, R50 and R740.

16 Claims, 2 Drawing Sheets

FOREIGN PATENT DOCUMENTS

| | | |
|---|---|---|
| JP | 4-350471 | 12/1992 |
| JP | 3208151 | 12/1992 |
| JP | 9-208940 | 8/1997 |
| JP | 2004-2492 | 1/2004 |
| JP | 2004-116945 | 4/2004 |
| WO | WO 01/23494 | 4/2001 |

* cited by examiner

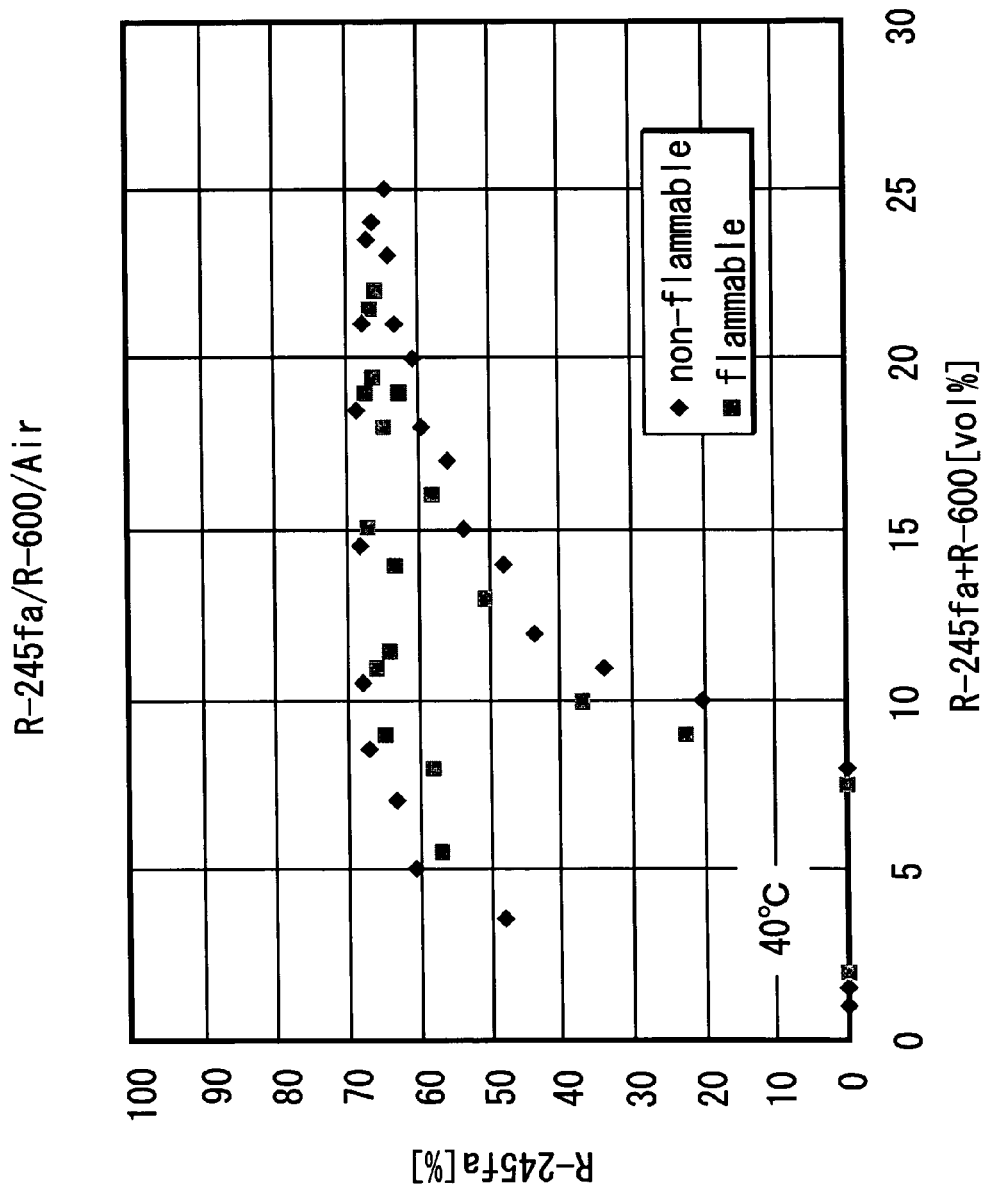

FREEZER UNIT

TECHNICAL FIELD

The present invention relates to a freezer unit of a so-called two dimensional refrigeration system comprising refrigerant circuits of two independent lines to configure heat exchangers by an evaporator in the refrigerant circuit on a high temperature side and a condenser in the refrigerant circuit on a low temperature side.

BACKGROUND ART

In a hitherto used freezer unit of the so-called two dimensional refrigeration system of this kind, refrigerant circuits on high and low temperature sides are constituted of respective refrigerant close circuits of two independent lines to configure heat exchangers by an evaporator in the refrigerant circuit on a high temperature side and a condenser in the refrigerant circuit on a low temperature side so that the refrigerants in the refrigerant circuit on the low temperature side are condensed by evaporation of the refrigerants in the refrigerant circuit on the high temperature side (refer to, for example, Japanese Utility Model Application Laid-Open No. 23,101/1983). In this way, as it becomes possible to use refrigerants of lower boiling points (evaporating temperatures) in the refrigerant circuit on the low temperature side, extremely low temperatures can be obtained by means of the evaporator in the refrigerant circuit on the low temperature side.

According to such a two-dimensional refrigeration system, low temperatures of the order of −80° C. are usually achieved in the evaporator in the refrigerant circuit on the low temperature side. In order to obtain even lower temperature, for example, such as −150° C., it would be required to improve the refrigerant circuits or take various measures for compositions of the refrigerants to be confined in the circuits.

The applicant of the present application had realized extremely low temperatures such as −150° C. by improving the compositions of the confined refrigerants as disclosed in an official gazette of Japanese Patent No. 3,208,151. In more detail, the low temperatures had been realized by confining mixed refrigerants including R22 (chlorodifluoromethane: $CHClF_2$), R142b (1-chloro-1,1-difluoroethane: $CH_3CClF_2$) and R21 (dichlorofluoromethane: $CHCl_2F$) into a refrigerant circuit on a high temperature side and mixed refrigerants including R21, R22 and R23 (tolyfluoromethane: $CHF_3$), R14 (carbone tetrafluoride: $CF_4$), R50 (methane: $CH_4$) and R740 (argon: Ar) into a refrigerant circuit on a low temperature side.

According to the compositions described above, however, the refrigerants such as R21 and R22 belonging to a so-called HCFC contain chlorine atoms which are presumed to be source of destruction of the ozone layer so that they are subjects to the ozone regulation. Consequently, there is a need for development of compositions for effective replacement of the hitherto used refrigerants, which can maintain performance of refrigerant circuits without modifying the conventional circuits, and without the risk of destruction of the ozone layer.

Incidentally, the R21 hitherto used is highly compatible with oil (alkyl benzene), and therefore, it serves to return the oil to a compressor as an oil carrier, thereby preventing defective lubrication or locking of the compressor. As the R21 is a refrigerant containing chlorine as described above, however, any other refrigerant is required substituting for the R21.

SUMMARY OF THE INVENTION

The present invention has been made to solve such problems of the prior art as described above, and it is an object of the invention to provide a freezer unit using refrigerants serving as an oil carrier and being capable of realizing extremely low temperatures such as −150° C. without using any refrigerants which are subjects of the ozone regulation.

According to the first invention of the present application, in a freezer unit comprising a refrigerant circuit on a high temperature side and a refrigerant circuit on a low temperature side to form independent closed refrigerant circuits which condense refrigerants delivered from compressors and thereafter evaporate the condensed refrigerants to achieve cooling action, and heat exchangers formed by an evaporator in the refrigerant circuit on the high temperature side and a condenser in the refrigerant circuit on the low temperature side, confined in the refrigerant circuit on the low temperature side are nonazeotropic mixed refrigerants containing R245fa, R600, R404A, R508A, R14, R50 and R740, or nonazeotropic mixed refrigerants containing R245fa, R600, R404A, R23, R14, R50 and R740, or nonazeotropic mixed refrigerants containing R245fa, R600, R404A, R508B, R14, R50 and R740.

According to the second invention of the present application, a content of the R245fa is 70% or more by weight with respect to the total weight of the R245fa and the R600 in the above invention.

According to the third invention of the present application, the respective refrigerants in proportion to the total weight of the nonazeotropic mixed refrigerants are 5 to 24% by total weight of the sum of the R245fa and R600, 13 to 28% by weight of the R404A, 21 to 37% by weight of the R508A, or R23, or R508B, 25 to 43% by weight of the sum of the R14 and R50, and 4 to 10% by weight of the R740 in each of the above inventions.

According to the fourth invention of the present application, 0.5 to 2% by weight of n-pentane is added to the nonazeotropic mixed refrigerants in each of the above inventions.

According to the fifth invention of the present application, nonazeotopic mixed refrigerants including R407D or R404A and n-pentane are confined in the refrigerant circuit on a high temperature side in each of the above inventions.

According to the invention of the present application, refrigerants still remaining in gas phase are sequentially condensed in a plurality of heat exchangers by utilizing differences between evaporating temperatures of the respective refrigerants without using refrigerants which are subjects of the ozone regulation to realize extremely low temperatures such as −150° C. in the evaporator in the final stage. In this manner, the performance of the refrigerant circuits can be maintained without any modification of conventional refrigerant circuits attended by the change in compositions of the refrigerants, and at the same time the environmental problem as the destruction of ozone layer can be solved. According to the compositions of refrigerants of the invention, the extremely low temperatures such as −150° C. can be realized so that living organisms and specimens can be reserved under a more stabilized condition with improved reliability for a long period of time.

According to the invention, particularly, in substitution for the R21 (dichlorofluoromethane) having a high boiling point (+8.9° C.) and highly compatible with oil (alkyl benzene and mineral oil), mixed refrigerants of R245fa (boiling point:

+15.3° C.) and R600 (−0.5° C.) are used. The R600 has a high boiling point and is highly compatible with oil. The mixed refrigerants of the R245fa and R600 are confined in the circuit so that the oil delivered into the circuit can be returned to the compressor in a dissolved state in the mixed refrigerants. In this way, a defective lubrication in the compressor can be prevented, and the R600 and R245fa in liquid state returned to the compressor are caused to be evaporated therein, thereby enabling the temperature of the compressor to be lowered.

The R600 (n-butane) alone is combustible. In order to overcome this disadvantage, according to the invention, the mixed refrigerants of the R245fa and R600 contain 70% or more by weight of the R245fa with respect to the total weight of the R245fa and R600 of the mixed refrigerants as in the second invention. In this manner, the mixed refrigerants containing the R600 are made to be incombustible so that the risk of burning when being leaked can be avoided, thereby improving the reliability of safety aspect.

DETAILED DESCRIPTION OF THE EMBODIMENTS

Figure 1:
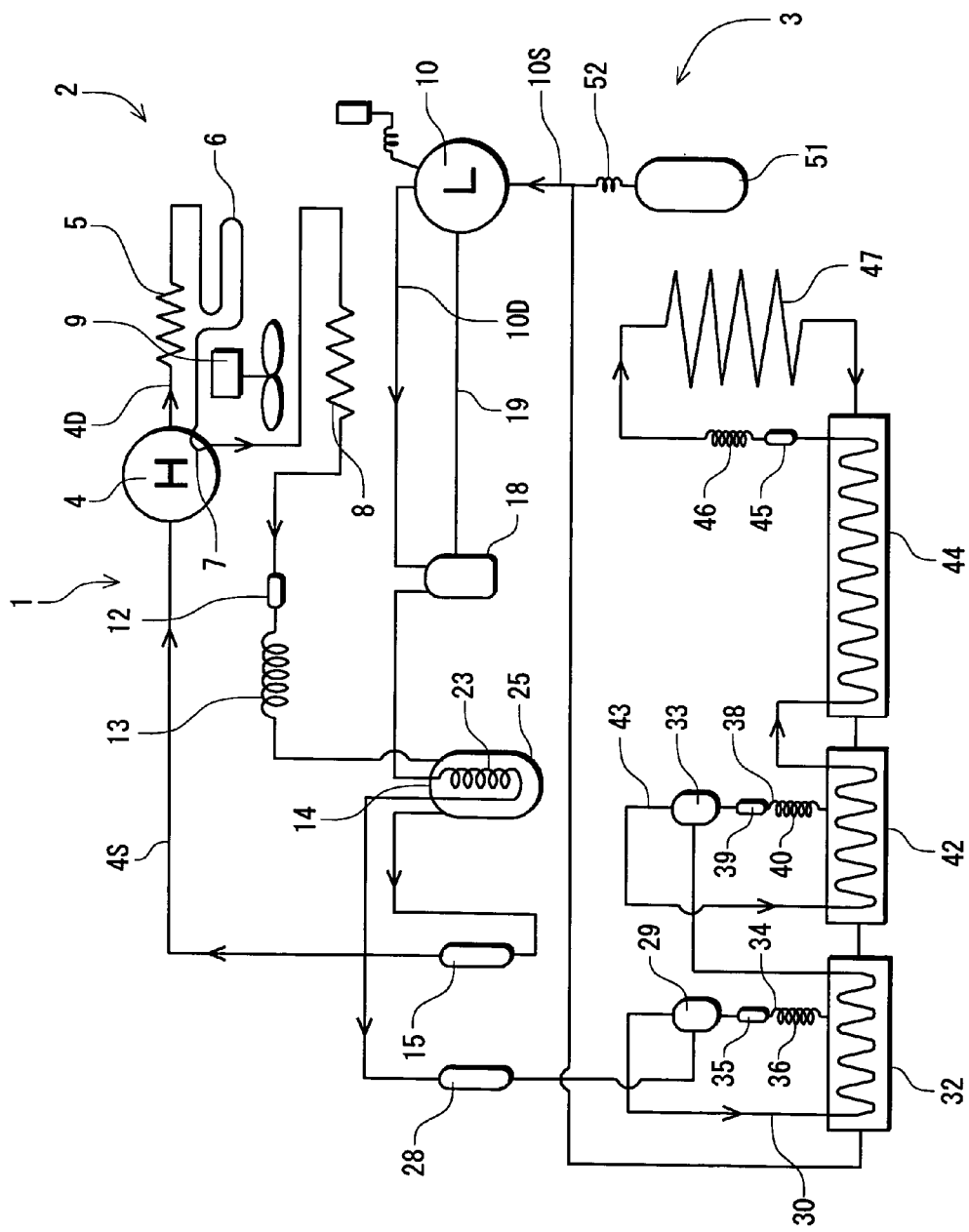
FIG. 1 is an illustration of refrigerant circuits of the freezer unit showing one embodiment of the invention; and, FIG. 2 is an illustration of combustible and incombustible states in relation to weight percent of R245fa with respect to the total weight of mixed refrigerants of R245fa and R600.

Embodiments of the present invention will then be explained in detail with reference to the drawings. FIG. 1 illustrates a refrigerant circuit 1 of a freezer unit according to the invention. The refrigerant circuit 1 comprises a refrigerant circuit 2 on a high temperature side as a first refrigerant circuit and a refrigerant circuit 3 on a low temperature side as a second refrigerant circuit independent from each other.

The refrigerant circuit 2 on the high temperature side comprises an electrically operated compressor 4, an auxiliary condenser 5, a dew preventing pipe 6, a condenser 8, a drier 12, a pressure reducing device 13 (for example a capillary tube), an evaporator 14 and an accumulator 15. The electrically operated compressor 4 is a compressor driven by an electric motor using single or three-phase alternating current power supply, the auxiliary condenser 5 being connected to the pipe 4D of the electrically operated compressor 4 on its delivery side. The auxiliary condenser 5 is connected to the dew preventing pipe 6 for heating opening edges of the storage chamber of a freezer (not shown) equipped with the freezer unit 1. Further, the dew preventing pipe 6 is connected to an oil cooler 7 of the electrically operated compressor 4 and then connected to the condenser 8 which is cooled by a condenser blower 9. A refrigerant pipe of the condenser 8 on its outlet side is connected sequentially through the drier 12 and the pressure reducing device 13 to an evaporator 14 as an evaporator part for constituting an evaporating section. Connected to a refrigerant pipe of the evaporator 14 on its outlet is the accumulator 15 as a reservoir for refrigerants. A refrigerant pipe extending from the accumulator 15 is connected to a pipe 4S of the electrically operated compressor 4 on its suction side.

The refrigerant circuit 2 on the high temperature side is filled with refrigerants including R407D and n-pentane as nonazeotropic refrigerants having different boiling points. The R407D is constituted of R32 (difluoromethane: $CH_2F_2$), R125 (pentafluoroethane: $CHF_2CF_3$) and R134a (1,1,1,2-tetrafluoroethane: $CH_2FCF_3$), and its composition is 15% by weight of R32, 15% by weight of R125 and 70% by weight of R134a. The boiling points of R32, R125 and R134a are −51.7° C., −48.1° C. and −26° C., respectively. Moreover, the boiling point of n-pentane is +36.1° C.

The refrigerants in a hot gas state delivered from the electrically operated compressor 4 are condensed in the auxiliary condenser 5, the dew preventing pipe 6, the oil cooler 7, and the condenser 8 so as to be liquefied, while giving off their heat, and thereafter the liquefied refrigerants are dried in the drier 12 to dissipate the contained water and decompressed in the pressure reducing device 13. The dried and decompressed refrigerants flow successively into the evaporator 14 so that the refrigerants R32, R125 and R134a will evaporate therein to absorb the heat of evaporation from the surround, thereby cooling the evaporator 14. Thereafter these refrigerants return through the accumulator 15 as the reservoir for the refrigerants to the electrically operated compressor 4.

At this time, the power of the electrically operated compressor 4 may be, for example, 1.5 HP and the finally attained temperature of the evaporator 14 in operation may become −27° C. to −35° C. At such lower temperatures, the n-pentane in the refrigerants remains in a liquid state without any evaporation in the evaporator 14 because of its boiling point of +36.1° C. Accordingly, the n-pentane hardly contributes to cooling but has a function to cause the lubricant of the electrically operated compressor 4 and the mixed moisture not being absorbed in the drier 12 to dissolve into the n-pentane to restore them into the electrically operated compressor 4, and a further function to lower the temperature of the compressor 4 by the evaporation of the n-pentane in the electrically operated compressor 4.

On the other hand, the refrigerant circuit 3 on the low temperature side comprises an electrically operated compressor 10, an oil separator 18, a condensation pipe 23 as a pipe of the high temperature side, inserted in the evaporator 14, a first gas-liquid separator 29, a first intermediate heat exchanger 32, a second gas-liquid separator 33, a drier 35, a pressure reducing device 36 (for example a capillary tube), a drier 39, a pressure reducing device 40 (for example a capillary tube), a second intermediate heat exchanger 42, a third intermediate heat exchanger 44, a drier 45, a pressure reducing device 46 (for example a capillary tube), an evaporating pipe 47, an expansion tank 51 and a pressure reducing device 52 (for example a capillary tube).

The electrically operated compressor 10 is a compressor driven by an electric motor using single or three-phase alternating current power supply similarly to the electrically operated compressor 4, the oil separator 18 being connected to the pipe 10D of the electrically operated compressor 10 on its delivery side. Connected to the oil separator 18 is an oil restoring pipe 19 for restoring the oil to the electrically operated compressor 10. Connected to the oil separator 18 on its outlet side is a refrigerant pipe which is in turn connected to the condensation pipe 23 as the pipe of the high temperature side piping, inserted in the evaporator 14. The condensation pipe 23 forms together with the evaporator 14 a cascade condenser 25.

Then, connected to the condensation pipe 23 on its outlet side is a delivery pipe which is in turn connected through a drier 28 to the first gas-liquid separator 29. The gas phase separated in the gas-liquid separator 29 passes through a gas phase pipe 30 and flows through the first intermediate heat exchanger 32 into the second gas-liquid separator 33. The liquid phase separated in the gas-liquid separator 29 flows through a liquid phase pipe 34 and through the drier 35 and the pressure reducing device 36 into the first intermediate heat exchanger 32.

The liquid phase separated by the second gas-liquid separator 33 flows through a liquid phase pipe 38 into a drier 39, and then through the pressure reducing device 40 into the second intermediate heat exchanger 42. The gas phase separated by the second gas-liquid separator 33 passes through a gas phase pipe 43 into the second intermediate heat exchanger 42 and the third intermediate heat exchanger 44 and flows through the drier 45 into the pressure reducing device 46. The pressure reducing device 46 is connected to the evaporating pipe 47 as an evaporator which is in turn connected to the third intermediate heat exchanger 44.

The third intermediate heat exchanger 44 is sequentially connected to the second and first intermediate heat exchangers 42 and 32 and then to the suction pipe 10S of the electrically operated compressor 10 on its suction side. Further, connected through the pressure reducing device 52 to the suction pipe 10S on the suction side is the expansion tank 51 for reserving the refrigerants when the electrically operated compressor 10 is not operative.

The refrigerant circuit 3 on the low temperature side is filled with a nonazeotropic mixed refrigerants containing R245fa, R600, R404A, R508A, R14 and R50 as six kinds of refrigerants having different boiling points. R245fa is 1,1,1,-3,3-pentafluoropropane ($CF_3CH_2CHF_2$) and R600 is butane ($CH_3CH_2CH_2CH_3$). Boiling points of R245fa and R600 are +15.3° C. and −0.5° C., respectively. Therefore, by mixing these by a predetermined ratio it becomes possible to use the mixture in place of the R21 having a boiling point of +8.9° C. which is hitherto used.

Since the R600 is combustible, the R600 is mixed with incombustible R245fa by a predetermined ratio which is 70:30 (R245fa:R600) in the present embodiment to obtain an incombustible mixture with which the refrigerant circuit 3 is filled. In the present embodiment, moreover, a content of the R245fa is 70% by weight with respect to the total weight of the mixture of R245fa and R600. If more than 70% by weight of R245fa, the mixture remains incombustible so that more than 70% by weight may be permissible.

FIG. 2 illustrates experimental results indicating that the mixed refrigerants of R245fa and R600 are incombustible. According to the results, it will be understood that when the R245fa is 70% or more by weight, the mixed refrigerants remain in the incombustible region of the graph. When the mixed refrigerants of the R245fa and R600 are filled in the circuit from the liquid phase portion of the refrigerants, variation in composition is within 0.6% at the most so that there is no risk that the refrigerants vary to combustible.

Moreover, the R404A is constituted of R125 (pentafluoroethane: $CHF_2CF_3$), R143a (1,1,1-tolyfluoroethane: $CH_3CF_3$), and R134a (1,1,1,2-tetrafluoroethane: $CH_2FCF_3$), and it's composition is 44% by weight of R125, 52% by weight of R143a and 4% by weight of R134. The boiling point of the mixed refrigerants is −46.5° C. Therefore, the mixed refrigerants can be used instead of the hitherto used R22 having the boiling point of −40.8° C.

Then, the R508A is constituted of R23 (tolyfluoromethane $CHF_3$) and R116 (hexafluoroethane: $CF_3CF_3$), ant its composition is 39% by weight of R23 and 61% by weight of R116. The boiling point of the mixed refrigerants is −85.7° C.

Further, the R14 is tetrafluoromethane (carbone tetrafluoride: $CF_4$) and the R50 is methane ($CH_4$). The R740 is argon (Ar). The boiling points of the R14, R50 and R740 are −127.9° C., −161.5° C. and −185.7° C., respectively. Moreover, there is a risk of explosion when the R50 is combined with oxygen. Such a risk of explosion can be eliminated by mixing with the R14. Therefore, even if an accidental leakage occurred, explosion would not occur.

Then, in filling the refrigerant circuit with the refrigerants described above, once the R245fa and R600 are mixed with each other, and the R14 and R50 are mixed with each other to obtain two incombustible mixed refrigerants. Thereafter, previously mixed with one another are the mixed refrigerants of the R245fa and R600, and R404A, R508A, and the mixed refrigerants of the R14 and R50, and R740 to obtain an ultimately mixed refrigerants which are confined into the refrigerant circuit. As an alternative, confined into the circuit are the R245fa and R600, subsequently the R404A, R508A, R14 and R50, and finally the R740 in the order of their higher boiling points. The composition of the charged refrigerants is, for example, 13% by weight of the mixed refrigerants of R245fa and R600, 20% by weight of the R404A, 27% by weight of the R508A, 33% by weight of the mixed refrigerants of the R14 and R50, and 7% by weight of the R740 with respect to the total weight of the ultimately mixed refrigerants.

The circulation of the refrigerants on the low temperature side will then be explained. The gaseous mixed refrigerants at high temperatures and high pressures delivered from the electrically operated compressor 10 flow into the oil separator 18 in which most of the lubricant of the electrically operated compressor mixed with the refrigerants is separated therefrom, and the separated lubricant is returned through the oil restoring pipe 19 into the electrically operated compressor 10. The refrigerants themselves flow into the cascade condenser 25 in which they are cooled in the evaporator 14 with the result that parts of refrigerants having higher boiling points (R245fa, R600, R404A and R508A) among the mixed refrigerants are condensed and liquefied.

The mixed refrigerants delivered from the condensation pipe 23 flow through the drier 28 into the first gas-liquid separator 29. At this point in time, the R14, R50 and R740 of the mixed refrigerants have not been condensed yet because of their very low boiling points and remain in gaseous states, and parts of the R245fa, R600, R404A, and R508A only as parts of the refrigerants have been condensed and liquefied. Therefore, the mixed refrigerants are separated into one group of the R14, R50 and R740 flowing into the gas phase pipe 30 and the other group of the R245fa, R600, R404A and R508A flowing into the liquid phase pipe 34.

The mixed refrigerants flowed into the gas phase pipe 30 are heat-exchanged in the first intermediate heat exchanger 32 to be condensed and then reach the second gas-liquid separator 33. At this point, the refrigerants at low temperatures returning from the evaporating pipe 47 flow into the first intermediate heat exchanger 32, and the liquid refrigerants flowed into the liquid phase pipe 34 flow through the drier 35 into the pressure reducing device 36 in which the liquid refrigerants are decompressed, and further flow into the first intermediate heat exchanger 32 in which the liquid refrigerants are evaporated to contribute to cooling. As a result, parts of the R14, R50, R740 and R508A having not been condensed are cooled so that an intermediate temperature in the first intermediate heat exchanger 32 may become about −50.7° C. Accordingly, the R508A in the mixed refrigerants passed through the gas phase pipe 30 will be completely condensed and liquefied, and the condensed and liquefied R508A is separated from the mixed refrigerants and flows into the second gas-liquid separator 33. The R14, R50 and R740 still remain in gaseous state because of their lower boiling points.

The R508A separated in the second gas-liquid separator 33 loses its water content in the drier 39 and is decompressed in the pressure reducing device 40. Thereafter the R508A flows into the second intermediate heat exchanger 42 where the R508A together with the lower temperature refrigerants returned from the evaporating pipe 47 cools the R14, R50 and R740 in the gas phase pipe 43 so that the R14 having the highest evaporating temperature among these refrigerants will be condensed, as a result of which an intermediate temperature in the second intermediate heat exchanger 42 may become −76.4° C.

The gas phase pipe 43 extending though the second intermediate heat exchanger 42 continuously extends through the third intermediate heat exchanger 44. At this point, returning into the third intermediate heat exchanger 44 are the refrigerants immediately after flowing out of the evaporator or evaporating pipe 47. According to the experimental results, the intermediate temperature in the third intermediate heat exchanger 44 may attain substantially low temperatures such as −121.4° C., and −151.5° C. at a location closer to its inlet.

For this reason, parts of the R50 and R740 in the gas phase pipe 43 are condensed in the third intermediate heat exchanger 44, and after the parts of these liquefied R14, R50 and R740 have been decompressed in the pressure reducing device 46, these decompressed refrigerants flow into the evaporating pipe 47 where these refrigerants evaporate to cool the surround. According to the experimental results, the temperature of the evaporating pipe 47 was extremely low temperatures such as −160.3° C. to −157.3° C.

Such an evaporating pipe 47 is located in, for example, a freezing storage for cooling the interior of the storage, thereby realizing a temperature of −157.5° C. in the storage.

The refrigerants delivered from the evaporating pipe 47 flow successively into the third, second and first intermediate heat exchangers 44, 42 and 32 to unite with the refrigerants evaporated in the respective heat exchangers so that the united refrigerants return through the suction pipe 10S into the electrically operated compressor 10.

The oil entrained in the refrigerants delivered from the electrically operated compressor 10 is mostly separated from the refrigerants in the oil separator 18 and returned to the compressor 10. However, the oil in the form of mist is delivered together with the refrigerants from the oil separator 18. Such an oil dissolves into the R600 which is highly compatible with oil, and the oil dissolved in the R600 will be returned to the compressor 10, thereby preventing defective lubrication and locking of the compressor 10. Moreover, the R600 in the liquid state returns to the compressor 10 and evaporates in the compressor 10 so that delivery temperatures of the compressor 10 can be lowered.

In the present embodiment, furthermore, 4% by weight of n-pentane (within a range of 0.5 to 2% by weight with respect to the total weight of the nonazeotropic refrigerants) may be added to the R404A. As the n-pentane is highly compatible with oil similarly to the R600, the oil in the form of mist delivered together with the refrigerants from the oil separator 18 can be returned to the compressor 10.

However, the n-pentane may often remain as a liquid in the compressor, or may flow into the circuit 3 on the low temperature side to cause the cooling performance to be unstable depending on equipment. In such a case, the mixing of the n-pentane should be avoided. Even if the n-pentane is not used, the compressor 10 can be smoothly operated because the refrigerants in the present embodiment include the R600 mixed therein which serves as an oil carrier.

It will be apparent that the compositions of the respective refrigerants according to the invention are not to be limited by those in the above embodiments. According to the experimental results, as recited in claim 3, if the nonazeotropic mixed refrigerants are constituted of 5 to 24% by weight of the sum of the R245fa and R600, 13 to 28% by weight of the R404A, 21 to 37% by weight of the R508A, 25 to 43% by weight of the sum of the R14 and R50, and 4 to 10% by weight of the R740 with respect to the total weight of the mixed refrigerants, extremely low temperatures of about −150° C. can be obtained in the evaporating pipe 47.

In the refrigerants confined in the refrigerant circuit 3 on the low temperature side in the embodiment described above, the same effects can be achieved by the use of the R508B or R23 instead of the R508A. The R508B contains R23 and R116 whose mixed ratio is 46:54.

What is claimed is:

1. A freezer unit comprising a refrigerant circuit on a high temperature side and a refrigerant circuit on a low temperature side to form independent closed refrigerant circuits which condense refrigerants delivered from compressors and thereafter evaporate the condensed refrigerants to achieve cooling action, and heat exchangers formed by an evaporator in the refrigerant circuit on the high temperature side and a condenser in the refrigerant circuit on the low temperature side, wherein confined in the refrigerant circuit on the low temperature side are nonazeotropic mixed refrigerants containing R245fa, R600, R404A, R508A, R14, R50 and R740 in combination at a predetermined ratio, or nonazeotropic mixed refrigerants containing R245fa, R600, R404A, R23, R14, R50 and R740 in combination at a predetermined ratio, or nonazeotropic mixed refrigerants containing R245fa, R600, R404A, R508B, R14, R50 and R740 in combination at a predetermined ratio.

2. The freezer unit as set forth in claim 1, wherein a content of the R245fa is 70% or more by weight with respect to the total weight of the R245fa and the R600.

3. The freezer unit as set forth in claim 1, wherein the respective refrigerants in proportion to the total weight of the nonazeotropic mixed refrigerants are 5 to 24% by total weight of the sum of the R245fa and R600, 13 to 28% by weight of the R404A, 21 to 37% by weight of the R508A, or R23, or R508B, 25 to 43% by weight of the sum of the R14 and R50, and 4 to 10% by weight of the R740.

4. The freezer unit as set forth in claim 1, wherein 0.5 to 2% by weight of n-pentane is added to the nonazeotropic mixed refrigerants.

5. The freezer unit as set forth in claim 1, wherein nonazeotropic mixed refrigerants constituted of R407D or R404A and n-pentane are confined in the refrigerant circuit on a high temperature side.

6. The freezer unit as set forth in claim 2, wherein the respective refrigerants in proportion to the total weight of the nonazeotropic mixed refrigerants are 5 to 24% by total weight of the sum of the R245fa and R600, 13 to 28% by weight of the R404A, 21 to 37% by weight of the R508A, or R23, or R508B, 25 to 43% by weight of the sum of the R14 and R50, and 4 to 10% by weight of the R740.

7. The freezer unit as set forth in claim 2, wherein 0.5 to 2% by weight of n-pentane is added to the nonazeotropic mixed refrigerants.

8. The freezer unit as set forth in claim 3, wherein 0.5 to 2% by weight of n-pentane is added to the nonazeotropic mixed refrigerants.

9. The freezer unit as set forth in claim 6, wherein 0.5 to 2% by weight of n-pentane is added to the nonazeotropic mixed refrigerants.

10. The freezer unit as set forth in claim 2, wherein nonazeotropic mixed refrigerants constituted of R407D or R404A and n-pentane are confined in the refrigerant circuit on a high temperature side.

11. The freezer unit as set forth in claim 3, wherein non-azeotropic mixed refrigerants constituted of R407D or R404A and n-pentane are confined in the refrigerant circuit on a high temperature side.

12. The freezer unit as set forth in claim 4, wherein non-azeotropic mixed refrigerants constituted of R407D or R404A and n-pentane are confined in the refrigerant circuit on a high temperature side.

13. The freezer unit as set forth in claim 6, wherein non-azeotropic mixed refrigerants constituted of R407D or R404A and n-pentane are confined in the refrigerant circuit on a high temperature side.

14. The freezer unit as set forth in claim 7, wherein non-azeotropic mixed refrigerants constituted of R407D or R404A and n-pentane are confined in the refrigerant circuit on a high temperature side.

15. The freezer unit as set forth in claim 8, wherein non-azeotropic mixed refrigerants constituted of R407D or R404A and n-pentane are confined in the refrigerant circuit on a high temperature side.

16. The freezer unit as set forth in claim 9, wherein non-azeotropic mixed refrigerants constituted of R407D or R404A and n-pentane are confined in the refrigerant circuit on a high temperature side.

* * * * *